United States Patent [19]

Fincher

[11] Patent Number: 4,580,350

[45] Date of Patent: Apr. 8, 1986

[54] LIE LEVEL

[76] Inventor: Fred T. Fincher, 508 Lincoln St., LaGrange, Ga. 30240

[21] Appl. No.: 700,598

[22] Filed: Feb. 11, 1985

[51] Int. Cl.⁴ .................... G01C 9/28; A63B 53/00
[52] U.S. Cl. .................................. 33/334; 33/347; 33/372; 33/508; 273/162 B
[58] Field of Search ............... 33/334, 347, 371, 372, 33/373, 508, DIG. 1; 273/162 B, 183 D, 194 A

[56] References Cited

U.S. PATENT DOCUMENTS

| | | | |
|---|---|---|---|
| 2,670,209 | 2/1954 | Fay | 33/372 |
| 2,923,552 | 2/1960 | Sundberg | 33/347 |
| 2,976,046 | 3/1961 | McCullough, Jr. | 33/334 |
| 3,909,004 | 9/1975 | Vella | 273/162 B |
| 4,079,520 | 3/1978 | Davis | 33/334 |
| 4,208,802 | 6/1980 | Berndt | 33/347 |

Primary Examiner—Richard R. Stearns
Attorney, Agent, or Firm—Michael C. Smith

[57] ABSTRACT

Apparatus for promoting straight golf ball flight paths by promoting in flight rotation of a golf ball along its horizontal axis by assuring horizontal alignment of parallel grooves of the face of a golf club as the club strikes a golf ball comprising a frame having an alignment ridge for insertion into one of said parallel grooves, means for securing level indication means to the frame in parallel alignment to the alignment ridge, level indication means, and means for temporarily attaching said frame to the face of a golf club in such a manner that said level indicator indicates the horizontal alignment of said parallel grooves.

17 Claims, 5 Drawing Figures

LIE LEVEL

TECHNICAL FIELD

The present invention relates generally to golf clubs and specifically to a lie level comprising means for attaching the lie level to a golf club in a predetermined position based upon one or more horizontal grooves inscribed in the face of the golf club and means for indicating the levelness of said horizontal grooves.

BACKGROUND ART

It is well known in the golfing art that the stance of the golfer in relationship to the golf ball is a fundamentally critical aspect of the method of the golfer. Since the grip of a golfer remains substantially uniform, the stance of the golfer is normally a function of the position of the golf ball. Ideally, the stance selected by the golfer is appropriate for a golf club swing which will carry the golf ball along a line of flight to the intended target.

U.S. Pat. No. 3,118,678 claims a mirrored sighting device for attachment to a golf club which is intended to allow the golfer to view the flag which marks the hole while swinging the golf club. U.S. Pat. No. 3,240,497 shows a variable weight, right handed or left handed golf putter with a level fixed in the top of the head. The level is disposed perpendicular to the face of the head in order to promote the presentation of a vertical putter face to the golf ball during putting.

Specifications for golf clubs as regulated by golfing associations such as the United States Golf Association and the Professional Golfers Association are relatively strict, and typically prohibit inclusion of sight means such as that of U.S. Pat. No. 3,118,678 and level means such as that of U.S. Pat. No. 3,240,497. In addition, since the golf club frequently encounters substantial shock as a result of striking a golf ball, permanent attachments such as those shown in the patents referred to above are of limited practicality. These alignment means are defined as dynamic alignment means because they depend upon the golfer for their application.

In contrast, static alignment means are incorporated in substantially all golf clubs in the form of plural parallel grooves inscribed in the face of the head. These parallel grooves are disposed horizontally on the face of the golf club head, as the face is most advantageously presented to the golf ball. Thus, when a golfer, having a proper grip and a proper stance in relationship to the golf ball swings the golf club, the parallel grooves on the face of the club strike the golf ball in horizontal alignment normally inclined from bottom front to top back which causes the golf ball to rotate along its horizontal axis as it travels toward the target. This horizontal rotation provides lift to the ball and promotes a straight flight path. If for some reason the parallel grooves are presented to the golf ball in a non-horizontal alignment, the flight path of the golf ball will curve to the right or to the left because the golf ball axis of rotation is not horizontal. While some curved flight paths would be advantageous, the typical golf game is more improved by consistently straight shots along a vertical plane toward the target.

DISCLOSURE OF INVENTION

The present invention is a dynamic alignment means which cooperates with the static parallel groove alignment means of the golf club head to promote and assure consistently straight golf ball flight paths. The present invention is a lie level comprising means for attaching the lie level to the golf club in a predetermined position based upon one or more of the horizontal grooves inscribed in the face of a golf club and means for indicating the levelness of the horizontal grooves. The lie level is adapted for temporary attachment to the golf club to promote a golfer stance which will result in presentation of the face of the club to the golf ball in such a manner that the grooves are in horizontal alignment.

Thus, the primary object of the present invention is to provide an apparatus for aligning the stance of a golfer based upon horizontal alignment of the club face grooves.

Another object is to provide apparatus for aligning the stance of a golfer which will promote rotation of the golf ball along its horizontal axis during flight.

Still another object is to provide apparatus for aligning the stance of a golfer which will promote a straight golf ball flight path.

BRIEF DESCRIPTION OF THE DRAWINGS

While the specification concludes with claims particularly pointing out and distinctly claiming the subject matter which is regarded as the invention, it is believed that the invention, objects, features, and advantages thereof will be better understood from the following description taken in connection with accompanying drawings in which like parts are given like identification numerals and wherein:

BEST MODE FOR CARRYING OUT THE INVENTION

Figure 1:
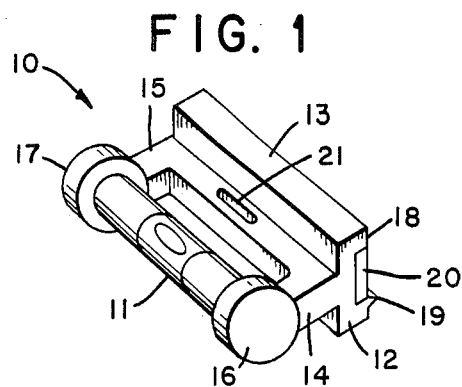
FIG. 1 is a front perspective view of a first preferred embodiment of the present invention.
Figure 2:
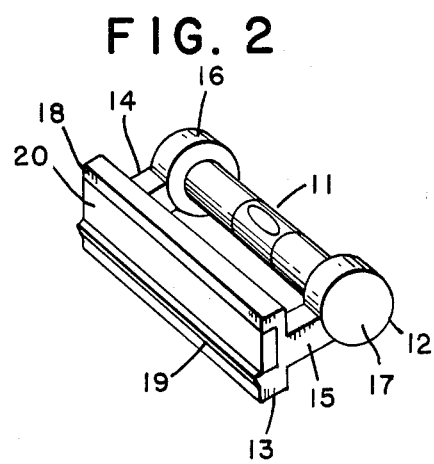
FIG. 2 is a rear perspective view of the first preferred embodiment.

The present invention is a lie level for a golf club. The lie level is designed to assure horizontal alignment of parallel grooves of the face of a golf club as the club strikes a golf ball comprising: frame means having a straight, generally horizontal alignment ridge for insertion into one of the parallel grooves of the face of the golf club; securement means for securing level indication means to said frame in parallel alignment with said alignment ridge; level indication means secured to said frame in parallel alignment with said alignment ridge; and means for temporarily attaching said frame to the face of a golf club in such a manner that said level indication means is parallel to the parallel grooves of the golf club face. FIG. 1 and FIG. 2 illustrate the level generally at 10, which comprises a conventional straight cylinder, liquid and bubble type level 11, and a frame 12. Frame 12 comprises a base 13 to which are connected a first arm 14 extending forward at about 90 degrees from base 13 and a second arm 15 extending forward at about 90 degrees from base 13 which cooperate to form a yoke for enclosing the ends of a bubble level 11 in a first receptacle 16 and a second receptacle 17 and to hold bubble level 11 parallel to the face 18 of base 13. Face 18 is generally flat, except for an alignment ridge 19 which is raised from about 0.396875 mm (1/64 inch) to about 0.79375 mm (1/32 inch) from the flat surface of face 18 and extends the length of base 13 in a straight line which is also parallel to bubble level 11. Face 18 is generally flat in order to cooperate with the generally flat face of a golf club, and ridge 19 is adapted to penetrate one of the parallel grooves of the face of the golf club. Generally flat rigid rear face 18 is adapted to contact the surface of a golf club face over substantially the entire surface of face 18 and straight alignment ridge 19 extends rearward at an angle of about 90 degrees and terminates in a straight edge slightly thinner than the width of one of the parallel grooves of the golf club face. While ridge 19 is shown at the bottom of face 18, it may be located at the top of face 18 instead. Bubble level 11 is parallel to alignment ridge 19. Inlaid into face 18 is a magnet 20 which has an outer surface which lies in the same plane as the generally flat portion of face 18 and extends the length of base 18. Since the majority of golf clubs are irons, the magnet 20 is used to hold the level 10 in place while the golfer adjusts his stance to a position which is most appropriate while the bubble level 11 indicates a level condition, which is also horizontal alignment of the parallel grooves of the face of the club.

Frame 12 is preferably constructed of relatively rigid plastic or similar material which will maintain the parallel alignment between bubble level 11 and face 18.

Figure 3:
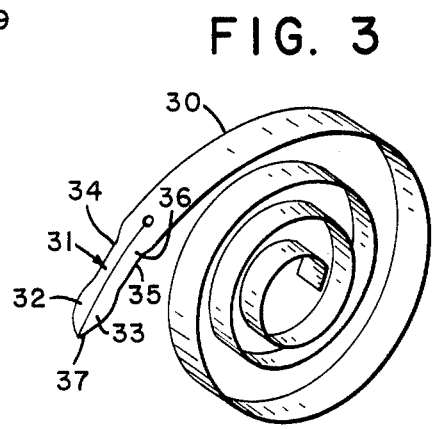
FIG. 3 is a perspective view of attachment means relating to the first preferred embodiment.
Figure 4:
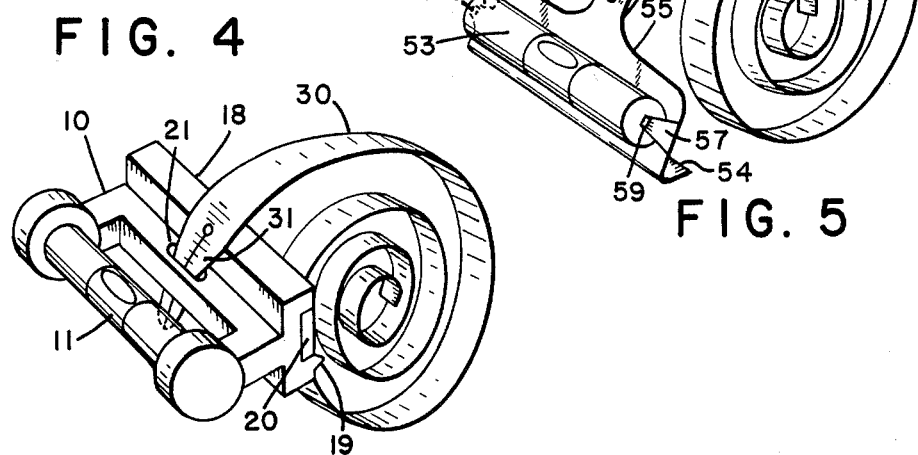
FIG. 4 is a perspective view of the first preferred embodiment attached to the attachment means.

When wood clubs are used, there is normally insufficient magnetism to hold level 10 against the face of the club. Therefore, alternate means are used to temporarily secure the level 10 to the club. FIG. 1 shows a slot 21 formed in the central portion of the body of frame 12. The slot 21 is parallel to face 18 and extends through frame 12 from top to bottom. Flat coil spring 30 of FIG. 3 is slightly wider than slot 21 and has an outer end 31 adapted for insertion into slot 21 of FIG. 1. Outer end 31 is split along the longitudinal axis of flat spring 30 a distance of approximately one inch forming a first clamp portion 32 and a second clamp portion 33. Flat spring 30 is preferrably metallic, but may be formed of similar material which will maintain a propensity to coil as shown and which will tend to hold clamp portions 32 and 33 separate, but adjacent and in the same plane as shown in FIG. 3. Flat coil spring 30, when attached to frame 12, extends in an upward, rearward, downward and frontward coil a plurality of progressively decreasing diameter rotations and terminates in a relatively tightly coiled inner end; and is substantially perpendicular to alignment ridge 19. Each clamp portion 32, 33 has a notch 34, 35 formed in its outer edge equidistant from the tip of outer end 31, resulting in a reduced width portion 36 as shown in FIG. 3. Together, portions 32 and 33 form expansion clamp 37. Slot 21 has a width less than the width of spring 30, but slightly greater than the reduced width portion 36 of clamp 37. The top to bottom length of slot 21 is slightly less than the longitudinal length of the reduced width portion 36, and the thickness of slot 21 is slightly larger than twice the thickness of spring 30. Thus, clamp portions 32 and 33 may be pinched together, resulting in one portion moving atop the other and a substantial temporary reduction in the width of clamp 37. Expansion clamp 37 can then be inserted into slot 21 until the notches 34 and 35 fully engage slot 21. Portions 32 and 33 then spring back outward into adjacent alignment against inner surfaces of slot 21 which holds level 10 on the end of spring 30 as shown in FIG. 4. Tapered transition between varying widths of expansion clamp 37 are preferred. Having been secured to level 10 in a manner wherein the longitudinal axis of spring 30 is substantially perpendicular to face 18 and bubble level 11, the coiled portion of spring 30 tends to move toward face 18. Thus, the face 18 can be placed on the face of a wood club with ridge 19 inserted into one of the parallel horizontal grooves of the face of the club and the spring 30 expanded and placed over the top of the head of the club and to the rear of the head, resulting in the spring 30 temporarily holding the bubble level 11 in parallel alignment with the horizontal grooves of the club. The golfer can then assume the proper stance by leveling the bubble level 11 as discussed hereinabove. While spring 30 is primarily an alternate means for attaching the level 10 to the club, it may cooperate with magnet 20 to assure attachment to an iron club.

Figure 5:
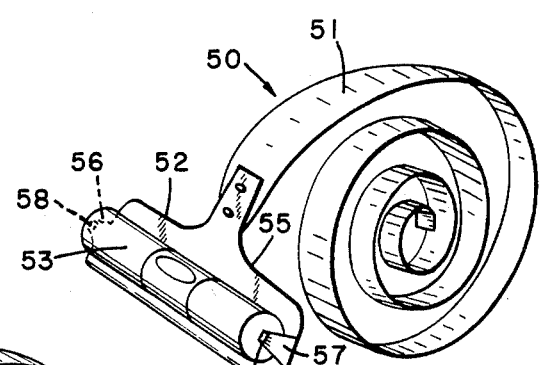
FIG. 5 is a perspective view of a second preferred embodiment of the present invention.

An alternate embodiment 50 is shown in FIG. 5. Flat coil spring 51 is permanently secured generally perpendicular to a frame 52 which holds a bubble level 53 parallel to an inward extending ridge 54 which can be inserted into one of the horizontal grooves of the club face as the spring extends over and around the club head as previously discussed to temporarily hold bubble level 53 parallel to the horizontal grooves of the club face.

Frame 52 comprises a flat rigid base 55 with said alignment ridge 54 extending from the bottom thereof at an angle of from about 60 degrees to about 80 degrees in a rearward direction for a distance of from about 6.35 mm (¼ inch) to about 9.525 mm (⅜ inch) and terminating in a straight edge slightly thinner than the width of one of the parallel grooves of the golf club head. A first arm 56 extends from a left end of base 55 at an angle of about 90 degrees in a frontward direction and a second arm 57 extends from a right end of base 55 at an angle of about 90 degrees in a frontward direction a distance equal to that of first arm 56. Each arm 56, 57 comprises receptacle means 58, 59 at the front ends thereof for securing level indication means 53 therebetween. Level indication means 53 comprises a straight tubular bubble level 53 secured between receptacle means 58, 59 in parallel alignment with alignment ridge 54. Attachment means comprises a flat coil spring 51 having an outer end secured to the top of said base 55, said spring 51 extending therefrom in an upward, rearward, downward and frontward coil a plurality of progressively decreasing diameter rotations, and terminating in a relatively tightly coiled inner end. Outer spring 51 end is secured to the top center of said base 55 and coil spring 51 is aligned substantially perpendicular to alignment ridge 54. Thus, the golfer is provided with dynamic means for aligning his stance based upon horizontal alignment of the static club face grooves, thereby promoting in flight rotation of the golf ball along its horizontal axis and a straight golf ball flight path.

While this invention has been described in detail with particular reference to a preferred embodiment thereof, it will be understood that variations and modifications can be effective within the spirit and scope of the invention as described hereinbefore and as defined in the appended claims.

INDUSTRIAL APPLICABILITY

This invention is capable of exploitation in the golf accessory industry, and is particularly useful in promoting straight golf ball flight paths.

I claim:

1. Apparatus for assuring horizontal alignment of parallel grooves of the face of a golf club as the club strikes a golf ball comprising:
   (a) a frame having a straight, generally horizontal alignment ridge for insertion into one of the parallel grooves of the face of the golf club;
   (b) securement means for securing level indication means to said frame in parallel alignment with said alignment ridge;
   (c) level indication means secured to said frame in parallel alignment with said alignment ridge; and
   (d) means for temporarily attaching said frame to the face of a golf club in such a manner that said level indication means is parallel to the parallel grooves of the golf club face.

2. The apparatus of claim 1 wherein said frame comprises a flat rigid base with said alignment ridge extending from the bottom thereof at an angle of from about 60 degrees to about 80 degrees in a rearward direction for a distance of from about 6.35 mm (¼ inch) to about 9.525 mm (⅜ inch) and terminating in a straight edge slightly thinner than the width of one of said grooves.

3. The apparatus of claim 2 wherein said securement means comprises a first arm extending from a left end of said base at an angle of about 90 degrees in a frontward direction and a second arm extending from a right end of said base at an angle of about 90 degrees in a frontward direction a distance equal to that of said first arm; further provided that each arm comprises receptacle means at the front ends thereof for securing level indication means therebetween.

4. The apparatus of claim 3 wherein said level indication means comprises a straight tubular bubble level secured between said receptacle means in parallel alignment with said alignment ridge.

5. The apparatus of claim 4 wherein said attaching means comprises a flat coil spring having an outer end secured to the top of said base, said spring extending therefrom in an upward, rearward, downward and frontward coil a plurality of progressively decreasing diameter rotations, and terminating in a relatively tightly coiled inner end.

6. The apparatus of claim 5 wherein said outer spring end is secured to the top center of said base, and said coil spring is aligned substantially perpendicular to said alignment ridge.

7. The apparatus of claim 1 wherein said frame comprises a generally flat rigid rear base adapted to contact the surface of a golf club face over substantially the entire surface of said base and a straight alignment ridge extending rearward from about 0.396875 mm (1/64 inch) to about 0.79375 mm (1/32 inch) at an angle of about 90 degrees and terminating in a straight edge slightly thinner than the width of one of said grooves.

8. The apparatus of claim 7 wherein said securement means comprises a first arm extending from a left end of said base at an angle of about 90 degrees in a frontward direction and a second arm extending from a right end of said base at an angle of about 90 degrees in a frontward direction a distance equal to that of said first arm; further provided that each arm comprises receptacle means at the front ends thereof for securing level indication means therebetween.

9. The apparatus of claim 8 wherein said level indication means comprises a straight tubular bubble level secured between said receptacle means in parallel alignment with said alignment ridge.

10. The apparatus of claim 9 wherein said attaching means comprises a magnet inlaid into said base and having an outer surface parallel to and lying in the same plane as the surface of said generally flat rigid rear base.

11. The apparatus of claim 10 wherein said magnet extends the length of said base.

12. The apparatus of claim 9 wherein said attachment means comprise:
    an attachment slot inscribed in the central portion of said frame and extending therethrough from top to bottom parallel to the rear surface of said base; and
    a flat coil spring slightly wider than said attachment slot and having clamping means formed at its outer end which can be inserted into said attachment slot for securing said spring to said frame.

13. The apparatus of claim 12 wherein said flat coil spring, when attached to said frame, extends in an upward, rearward, downward and frontward coil a plurality of progressively decreasing diameter rotations and terminates in a relatively tightly coiled inner end.

14. The apparatus of claim 13 wherein said clamping means comprises an expansion clamp which presses outward against the inner surfaces of said attachment slot when inserted therein.

15. The apparatus of claim 14 wherein said spring, when secured to said frame, extends substantially perpendicular to said alignment ridge.

16. The apparatus of claim 15 wherein said expansion clamp comprises a left clamp portion and a right clamp portion formed of said flat spring, each having an outer notch formed equidistant from the tip of said clamp, each notch having a longitudinal length slightly larger than the top to bottom depth of said attachment slot, the combined expanded width of said notches being slightly less than the width of said attachment slot, and the thickness of each clamp portion being slightly less than one half of the front to back thickness of said attachment slot.

17. The apparatus of claim 16 wherein width transitions of said expansion clamp portions are tapered.

* * * * *